United States Patent [19]
Reitman

[11] 4,013,092
[45] Mar. 22, 1977

[54] TWIST-LOCK VALVE IMPROVEMENT

[76] Inventor: Abraham Isadore Reitman, 10407 Byron Ave., Oakland, Calif. 94603

[22] Filed: Apr. 12, 1972

[21] Appl. No.: 243,512

[52] U.S. Cl. .............. 137/426; 251/291; 137/442; 137/443

[51] Int. Cl.² ................................. F16K 31/20

[58] Field of Search .......... 251/234, 291; 137/426, 137/434, 442, 443, 446

[56] References Cited

UNITED STATES PATENTS

| | | | |
|---|---|---|---|
| 1,440,199 | 12/1922 | Wissing | 137/426 X |
| 2,827,916 | 3/1958 | Manchester | 137/443 X |
| 2,847,025 | 8/1958 | Reitman | 137/442 X |
| 2,940,724 | 6/1960 | Sieling | 251/291 X |
| 3,385,317 | 5/1968 | Yankers | 251/234 X |
| 3,406,711 | 10/1968 | Fogg | 137/443 |

*Primary Examiner*—Henry T. Klinksiek
*Attorney, Agent, or Firm*—Robert R. Tipton

[57] ABSTRACT

A valve is provided with a longitudinally adjustable orifice and an actuating assembly which is held in the valve body by a twist-lock action configuration which permits removal of the actuating assembly without tools to obtain access to the orifice for fine adjustment of shut-off position of the valve. Gross adjustments by increments is provided in adjusting the angular relation of the float operating arm with the valve actuating arm.

5 Claims, 7 Drawing Figures

U.S. Patent    Mar. 22, 1977    4,013,092

TWIST-LOCK VALVE IMPROVEMENT

BACKGROUND OF THE INVENTION

This invention relates to valves and in particular to the assembly and adjustment of valves.

Where valves are used in remote locations, it is desirable that they be easily adjusted, assembled and disassembled with either the simplest of tools or preferably no tools at all.

The valves of the prior art generally require crescent wrenches and screw drivers for their adjustment, assembly and disassembly the development of such valves being directed toward novel operation rather than those configurations designed for easier maintenance and adjustment.

SUMMARY OF THE INVENTION

The valve of the present invention is of a configuration that can be assembled and disassembled without tools by utilizing an assembly that can be inserted in the valve body and twisted to lock in place and whose shut-off position can be changed by adjustment of the position of the orifice as desired.

It is, therefore, an object of the present invention to provide a valve which can be assembled and disassembled without the use of tools.

It is a further object of the present invention to provide a valve which can be easily adjusted as to its shut-off position.

It is another object of the present invention to provide a valve with an orifice which is adjustable as to its position in the valve.

It is still another object of the present invention to provide a float operated valve.

It is yet a further object of the present invention to provide a float operated valve in which the float position is adjustable in increments without the use of tools.

These and other objects of the present invention will be manifest upon careful study of the following detailed description when taken together with the drawings.

DESCRIPTION OF THE PREFERRED EMBODIMENT

Figure 1:
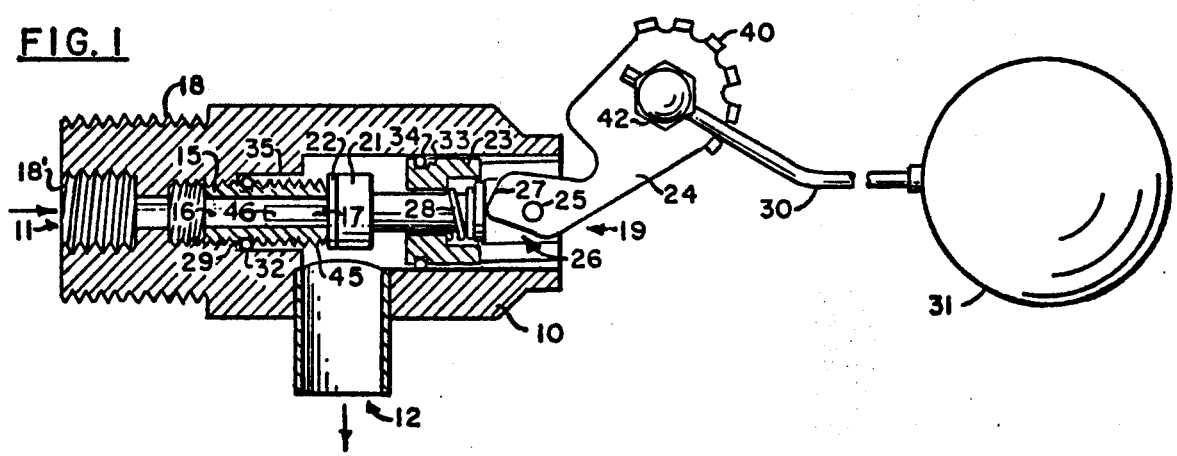
FIG. 1 is a longitudinal sectional view of the valve of the present invention showing the relationship of all of its parts.

The basic configuration of the valve of the present invention is illustrated in FIG. 1 and comprises a valve body 10 having an inlet end 11 and an outlet end 12 and containing an adjustable orifice 15 having an inlet port 16 and an outlet port 17 communicating, respectively, with inlet end 11 and outlet end 12 of valve body 10.

Threads 18 are provided on the outside of valve body 10 at inlet end 11 for connection to an inlet pipe (not shown). Threads 18' are also provided on the inside of inlet end 11 to facilitate connection of a smaller pipe to the valve.

Valve body 10 also contains a valve actuating assembly 19 for controlling the flow of fluid through the valve which comprises a plunger 21 having a gasket attached to one end which is adapted to engage the edges of outlet port 17 of orifice 15 and achieve a liquid tight seal therewith.

Actuating assembly 19 also comprises actuating assembly bracket 23 which serves to guide plunger 21 toward and away from orifice 15, and additionally comprises plunger actuating arm 24 which is pivotally connected to assembly bracket 23 by actuating arm pin 25. One end of actuating arm 24 is formed to define a cam 26 which is adapted to engage the end of plunger 21 distal gasket 22 as a cam follower so that plunger 21 reciprocates back and forth, toward and away from orifice 15 as actuating arm 24 is rotated about pin 25.

In order to maintain the end of plunger 21 against cam 26, a plunger spring 28 is placed around plunger 21 between the end of plunger 21 engaging cam 26 and bracket 23 to bias it against cam 26.

It can be seen that as actuating arm 24 is rotated to impress the highest point of cam 26 against plunger 21, gasket 22 will be forced against exit port 17 of orifice 15 thus stopping the flow of fluid through the valve. The shape of cam 26 can be formed to establish the rate at which plunger 21 approaches outlet port 17 for various angular positions of actuating arm 24.

It will also be noted that as actuating arm 24 is rotated further past the high point of cam 26, it will come to rest on flat portion 27 thus locking valve actuating assembly 19 in the closed position.

At the outer end of actuating arm 24 is connected operating arm 30 at the end of which is attached a float 31.

As the liquid rises in the tank in which the valve and float are mounted, float 31 will be caused to rise, and when it reaches the point shown in FIG. 1, it will cause the valve to shut off as shown.

In order to prevent liquid from leaking out of the valve between valve body 10 and actuating assembly bracket 23, and also to provide some frictional resistance to movement of actuating assembly bracket 23, a groove 33 is provided peripherally about the lower end of bracket 23 in which is place an O-ring 34 whose outside diameter is slightly greater than the inside diameter of body 10 to insure a liquid tight seal when bracket 23 is secured in place in valve body 10.

Also, in order to prevent liquid from leaking around orifice 15, a groove 29 is provided about the middle of orifice 15 which is provided with an O-ring 32. A counterbore 35 is provided about orifice 15 which is of a diameter slightly less than the outside diameter of O-ring 32.

Valve actuating assembly 19 is connected to valve body 10 through the use of a twist-lock type of connection which is shown in greater detail in FIGS. 2, 3, 4, 5 and 6.

Figure 2:
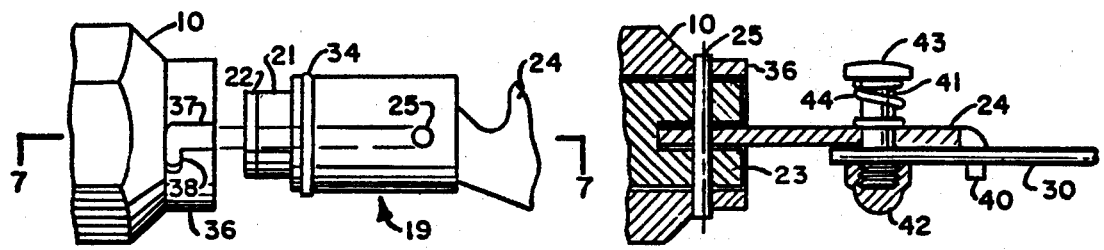
FIG. 2 is an exploded partial view of the valve of the present invention showing the twist-lock connection when the valve actuating assembly is removed from the valve body.

With reference to FIG. 2, valve actuating assembly 19 is shown in exploded view outside of valve body 10 with pin 25 positioned preparatory to inserting actuating assembly 19 into valve body 10.

Figure 3:
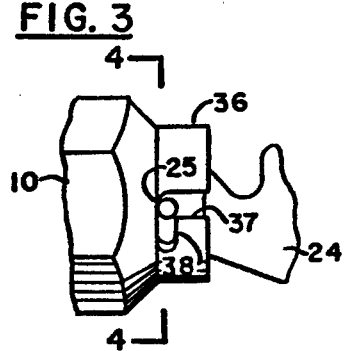
FIG. 3 is a partial view of the valve of the present invention showing the twist-lock connection when the valve actuating assembly is inserted in the valve body but before it is locked in place.
Figure 4:
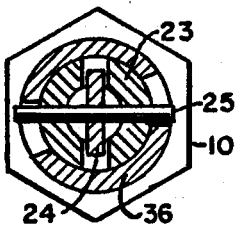
FIG. 4 is a section through the valve of the present invention taken at line 4—4 in FIG. 3.
Figure 5:
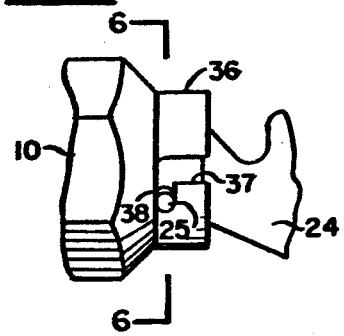
FIG. 5 is a view of the valve of the present invention showing the twist-lock connection when the valve actuating assembly is inside the valve body and locked in place.

Valve body 10, at its upper end shown in FIGS. 2, 3 and 5 comprises an upper neck section 36 which includes two longitudinal slots 37 on opposite sides of neck section 36 that extend from the top edge of neck 36 down to where neck 36 meets body 10, and circumferential slot 38. Both slots 37 and 38 are adapted to receive the ends of pin 25.

As can be seen in FIG. 3, when assembly 19 is inserted in valve body 10, the ends of pin 25 enter and are guided by slot 37 until assembly 19 is inserted in valve body 10 for pin 25 to be positioned on the bottom of slot 37 opposite the opening of circumferential slot 38.

Figure 6:
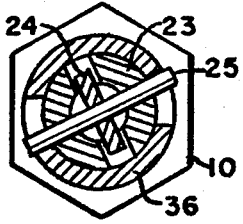
FIG. 6 is a section through the valve of the present invention taken at line 6—6 in FIG. 5.

To lock assembly 19 into body 10, assembly 19 is twisted or rotated to the left as can be seen in FIGS. 5 and 6, thus forcing the ends of pin 25 into circumferential slot 38. Thus by a twistlock action, assembly 19 is held in place in valve body 10.

To assure that assembly 19 will stay in place, circumferential slot 38 should be of a width sufficient to accept pin 25 but afford some frictional resistance to its release, but must permit freedom of rotation of pin 25 when in the assembled position so that the rotation of actuating arm 24 will not be prevented.

Figure 7:
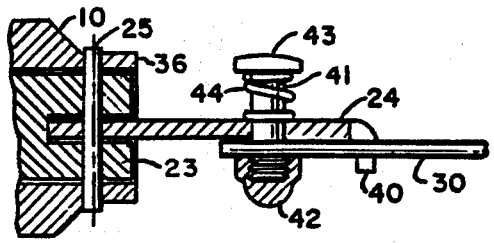
FIG. 7 is a partial section of the operating assembly of the valve of the present invention taken at line 7—7 in FIG. 2 showing the apparatus for adjusting the angular position of the float arm.

With reference to FIG. 7, in order to change the angular relationship between actuating arm 24 and operating arm 30, there is provided at the outer end of actuating arm 24 a plurality of detents or fingers 40 disposed at equal angular intervals about pivot pin 41 and extending perpendicular to arm 24 and parallel to the axis of rotation of pin 41, and adapted to engage operating arm 30.

Operating arm 30 is attached to pin 41 by cap nut 42 and is permitted to rotate with pin 41.

In order to hold operating arm 30 in engagement between fingers 41, pin 41 is provided with a cap 43 and a helical spring 44 which encircles pin 41 and biases cap 43 away from actuating arm 44 resulting in the holding of operating arm 30 between fingers 40.

Cap 43 of pin 41 is provided with a rounded surface in order to permit pin 41 to be pushed down against spring 44 in order to lift operating arm 30 above the ends of fingers 40 and be rotated to another incremental angle defined by the spacing between fingers 40.

Thus the position of float 31 to achieve valve shut-off can be adjusted for incremental angles between actuating arm 24 and operating arm 30.

To obtain fine adjustment of shut-off position, that is, shut-off for particular positions between incremental positions of arm 30 and float 31, orifice 15 is provided with screw threads 45 along its length and for a short distance along the inside of exit port 17 are provided hexagonal sides 46 (FIG. 1) adapted to receive a hexagonal pin or "Allen" wrench and be rotated thereby.

Although hexagonal sides are indicated, any configuration which would accept a screw driver, or other simple tool or object would be permissible.

It will be noted that orifice 15 is adjustable along its longitudinal axis which is also coincident with the longitudinal axis of plunger 21. Thus, adjustment of orifice 25 toward plunger 21 will permit shut-off of the valve for less movement of plunger 21. Depending upon the shape of actuating arm cam 26, with its connected operating arm 30 and float 31, less rotation of arm 24 will be required to cause gasket 22 to engage exit port 17. Movement of orifice 15 to a position away from plunger 21 will result in greater amount of rotation of actuating arm 24 to achieve valve shut-off.

It will also be noted that orifice 15 is arranged to be reversible, that is, either end of orifice 15 can be inserted in valve body 10 first. Thus, if one port becomes worn, the other port can be used by reversing the orifice. Also, with proper orifice design, the flow in one direction can be different from the flow in the other direction.

Thus it can be seen that through the use of incremental adjustments of operating arm 30 relative to actuating arm 24 and fine adjustment of the position of orifice 25, valve shut-off can be adjusted for any float position.

In addition, such adjustments including maintenance of the valve can be made merely by rotating or twisting actuating assembly 19 to the right until pin 25 is removed from circumferential slot 38 and aligned with longitudinal slot 37 and then pulling actuating assembly 23 longitudinally out of valve body 10.

An "Allen" or hexagonal wrench (not shown) can be inserted in exit port 17 of orifice 15 to engage hexagonal sides 46 to either rotate orifice 15 to a new position or remove it from valve body 10 for cleaning or replacement, if desired, with either a larger or smaller orifice.

The valve is then reassembled by reversing the above described steps.

Thus, a valve is provided which can be assembled and disassembled with the simplest of tools.

I claim:
1. A valve comprising
means defining a valve body member having an inlet and an outlet,
means defining an orifice in said valve body having an inlet port and an outlet port, said inlet and outlet ports respectively in communication with said inlet and outlet of said valve body member,
means for opening and closing said orifice disposed proximate one port of said orifice comprising a valve actuating assembly,
means for connecting said valve actuating assembly to said valve member comprising
means defining a slot in said valve body member having a longitudinal portion and a circumferential portion, and
means defining a pin connected to said actuating assembly and having ends protruding from said actuating assembly adapted to engage said circumferential portion of said slot by passing along said longitudinal portion of said slot to lock in said circumferential portion by rotation of said actuation assembly about the longitudinal axis of said valve body member and remain longitudinally immovable in said slot during operation of said valve,
said valve actuating assembly comprising
an actuating assembly bracket,
a plunger disposed in said actuating assembly bracket having one end disposed proximate one port of said orifice and adapted to engage one port of said orifice and maintain a sealed relation thereto,
a plunger actuating arm disposed proximate the end of said plunger distal said orifice port, said actuat- ing arm pivotally connected to said actuating assembly bracket by said pin and adapted to engage and actuate said plunger, an operating arm connected to said plunger actuating said arm distal said plunger, a spring biased against said plunger and said actuating assembly bracket adapted to bias said plunger away from said orifice and against said plunger actuating arm, and means disposed on said plunger actuating arm for making fixed incremental adjustments in angular relationship between said plunger actuating arm and said operating arm.

2. The valve as claimed in claim 1 wherein said means for making angular adjustments comprises means disposed on said actuating arm distal said plunger for rotating said operating arm relative to said actuating arm, and means disposed proximate said means for rotation for holding said arm in a plurality of incremental angular positions relative to said actuating arm.

3. The valve as claimed in claim 2 wherein said means for holding said operating arm in a plurality of angular positions comprises a plurality of fingers disposed around said means for rotation adapted to engage said operating arm disposed at angular intervals about the axis of rotation of said operating arm, and means disposed proximate said means for rotation for biasing said arm between said fingers and for releasing said arm from between said fingers for adjustment of the angular position thereof.

4. The valve as claimed in claim 3 wherein said means for biasing said arm between said fingers comprising a spring having one end biased against said actuating arm and the other end biased against said operating arm.

5. The valve as claimed in claim 1 wherein said means defining an orifice further comprises means connected to said valve body member and said orifice for adjusting the position of said orifice along the axis of motion of said valve actuating assembly.

* * * * *